(12) United States Patent
LaRue et al.

(10) Patent No.: US 9,446,355 B2
(45) Date of Patent: Sep. 20, 2016

(54) POROUS POLYMERIC MEMBRANE WITH HIGH VOID VOLUME

(71) Applicant: Pall Corporation, Port Washington, NY (US)

(72) Inventors: Geoffrey P. LaRue, Gulf Breeze, FL (US); Yolando David, Glen Cove, NY (US); Shane Edward Harton, Port Washington, NY (US)

(73) Assignee: PALL CORPORATION, Port Washington, NY (US)

( * ) Notice: Subject to any disclaimer, the term of this patent is extended or adjusted under 35 U.S.C. 154(b) by 188 days.

(21) Appl. No.: 14/194,066

(22) Filed: Feb. 28, 2014

(65) Prior Publication Data
US 2015/0246322 A1 Sep. 3, 2015

(51) Int. Cl.
  *B01D 69/02* (2006.01)
  *B01D 67/00* (2006.01)
  *B01D 61/14* (2006.01)
  *B01D 69/06* (2006.01)

(52) U.S. Cl.
  CPC .............. *B01D 69/02* (2013.01); *B01D 61/14* (2013.01); *B01D 67/003* (2013.01); *B01D 67/0011* (2013.01); *B01D 69/06* (2013.01); *B01D 2323/08* (2013.01); *B01D 2323/18* (2013.01); *B01D 2325/02* (2013.01); *B01D 2325/021* (2013.01); *B01D 2325/022* (2013.01); *B01D 2325/14* (2013.01); *B01D 2325/16* (2013.01)

(58) Field of Classification Search
None
See application file for complete search history.

(56) References Cited

U.S. PATENT DOCUMENTS

| | | | |
|---|---|---|---|
| 2,913,419 | A | 11/1959 | Alexander |
| 2,974,108 | A | 3/1961 | Alexander |
| 4,177,228 | A | 12/1979 | Prolss |
| 4,188,418 | A | 2/1980 | Livingston |

(Continued)

FOREIGN PATENT DOCUMENTS

| | | |
|---|---|---|
| CA | 2509628 C | 11/2007 |
| DE | 10058258 A1 | 8/2002 |

(Continued)

OTHER PUBLICATIONS

Cai et al., "An improved convective self-assembly method for the fabrication of binary colloidal crystals and inverse structures", *Journal of Colloid and Interface Science*, 380, 42-50 (2012).

(Continued)

*Primary Examiner* — Krishnan S Menon
(74) *Attorney, Agent, or Firm* — Leydig, Voit & Mayer, Ltd.

(57) ABSTRACT

Membranes comprising first and second surfaces, the first surface comprising a patterned surface comprising peaks and valleys, first region surfaces comprising peaks, and second region surfaces comprising valleys; a porous bulk between the surfaces, the bulk comprising first region bulks and second region bulks; the region bulks extending from their respective region surfaces, the first region bulks comprising a first set of pores having outer rims, and a second set of pores connecting the outer rims of the first set of pores, and a first polymer matrix supporting the first set of pores; the second region bulks comprising a third set of pores having outer rims, and a fourth set of pores connecting the outer rims of the third set of pores, and a second polymer matrix supporting the third set of pores; filters including the membranes, and methods of making and using the membranes, are disclosed.

10 Claims, 4 Drawing Sheets

(56) References Cited

U.S. PATENT DOCUMENTS

Figure 1:
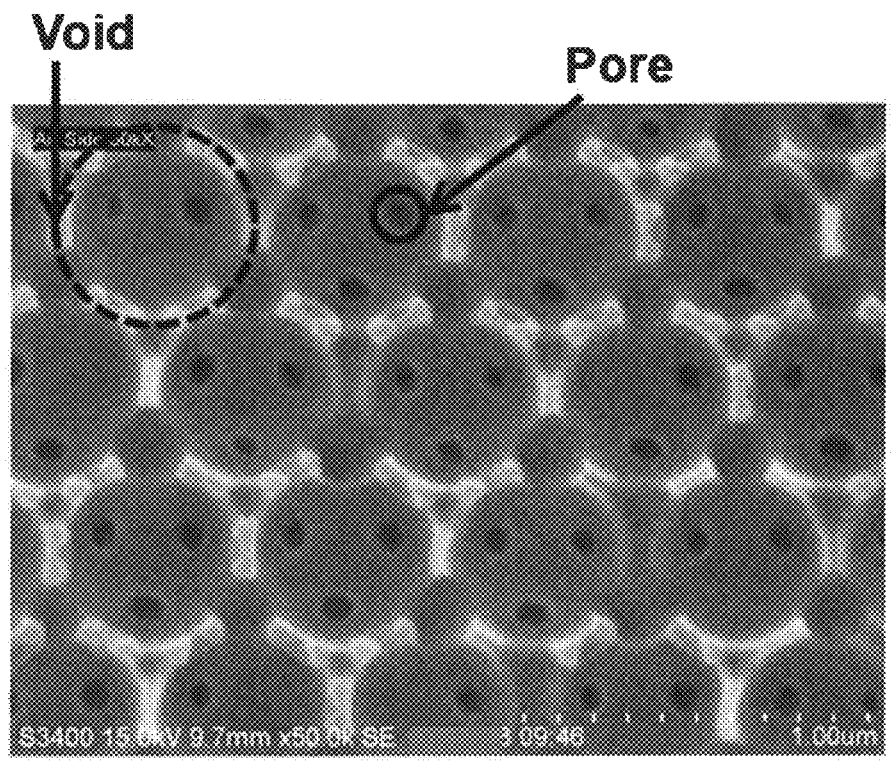

| | | | |
|---|---|---|---|
| 4,289,600 | A | 9/1981 | Lazarz et al. |
| 4,289,681 | A | 9/1981 | Nauroth et al. |
| 4,764,497 | A | 8/1988 | Shattes et al. |
| 4,940,571 | A | 7/1990 | Su et al. |
| 5,024,826 | A | 6/1991 | Linton |
| 5,100,581 | A | 3/1992 | Watanabe et al. |
| 5,102,917 | A | 4/1992 | Bedwell et al. |
| 5,221,497 | A | 6/1993 | Watanabe et al. |
| 5,453,260 | A | 9/1995 | Nakazawa et al. |
| 5,938,874 | A | 8/1999 | Palomo et al. |
| 6,372,806 | B1 | 4/2002 | Keiser et al. |
| 6,517,763 | B1 | 2/2003 | Zakhidov et al. |
| 6,548,264 | B1 | 4/2003 | Tan et al. |
| 6,680,013 | B1 | 1/2004 | Stein et al. |
| 6,770,130 | B2 | 8/2004 | Kato et al. |
| 6,800,267 | B2 | 10/2004 | Schubert et al. |
| 6,855,427 | B2 | 2/2005 | Kunkeler et al. |
| 6,890,436 | B2 | 5/2005 | Komatsu et al. |
| 6,906,109 | B2 | 6/2005 | Paszkowski |
| 6,929,764 | B2 | 8/2005 | Jiang et al. |
| 7,438,875 | B2 | 10/2008 | Do et al. |
| 7,901,727 | B2 | 3/2011 | Hofmann et al. |
| 8,003,707 | B2 | 8/2011 | Holland |
| 8,052,788 | B2 | 11/2011 | MacDonald |
| 8,163,388 | B2 | 4/2012 | Do et al. |
| 8,168,563 | B2 | 5/2012 | Do et al. |
| 8,211,193 | B2 | 7/2012 | Mahulikar et al. |
| 8,288,455 | B1 | 10/2012 | Miller |
| 8,309,113 | B2 | 11/2012 | Hofmann et al. |
| 8,431,034 | B2 | 4/2013 | Petronis et al. |
| 8,518,361 | B2 | 8/2013 | Chang et al. |
| 2002/0011443 | A1* | 1/2002 | Komatsu ............. B01D 63/024 210/650 |
| 2005/0234136 | A1 | 10/2005 | Holland et al. |
| 2006/0283095 | A1 | 12/2006 | Mahulikar et al. |
| 2007/0125701 | A1* | 6/2007 | Ramaswamy ..... B01D 67/0062 210/490 |
| 2010/0155325 | A1 | 6/2010 | Zhang et al. |
| 2010/0272996 | A1 | 10/2010 | Holmes et al. |
| 2010/0311871 | A1 | 12/2010 | Suemura et al. |
| 2011/0251057 | A1 | 10/2011 | Keiser et al. |
| 2012/0107601 | A1 | 5/2012 | Weitz |
| 2012/0276275 | A1 | 11/2012 | Ergang et al. |
| 2013/0112613 | A1 | 5/2013 | Kang et al. |
| 2013/0115295 | A1 | 5/2013 | Wang et al. |
| 2013/0134081 | A1* | 5/2013 | Kang .................... B01D 67/003 210/196 |
| 2013/0146539 | A1 | 6/2013 | Larue et al. |
| 2013/0199995 | A1 | 8/2013 | Jiang et al. |
| 2015/0246320 | A1 | 9/2015 | David et al. |
| 2015/0246321 | A1 | 9/2015 | Wu et al. |
| 2015/0246323 | A1 | 9/2015 | Singh et al. |
| 2015/0246324 | A1 | 9/2015 | Singh et al. |
| 2015/0246325 | A1 | 9/2015 | Singh et al. |
| 2015/0246326 | A1 | 9/2015 | David et al. |
| 2015/0246328 | A1 | 9/2015 | David et al. |

FOREIGN PATENT DOCUMENTS

| | | |
|---|---|---|
| DE | 102006010831 A1 | 9/2007 |
| DE | 102006036863 A1 | 2/2008 |
| EP | 477689 A1 | 4/1992 |
| EP | 2 476 724 A1 | 7/2012 |
| JP | 56-11931 A | 2/1981 |
| JP | 03-277639 A | 12/1991 |
| JP | 2002-527335 A | 8/2002 |
| JP | 2003-93852 A | 4/2003 |
| JP | 2012-107144 A | 6/2012 |
| SG | 10201401356 T | 12/2014 |
| WO | WO 2005/063385 A1 | 7/2005 |
| WO | WO 2012/097967 A1 | 7/2012 |
| WO | WO 2013/130893 A2 | 9/2013 |

OTHER PUBLICATIONS

Ding et al., "Experimental Investigation of Particle-Assisted Wetting", *Journal of American Chemical Society*, 128, 4930-4931 (2006).

Gates et al., "Fabrication and Characterization of Porous Membranes with Hightly Ordered Three-Dimensional Periodic Structures", *Chemistry of Materials*, 11, 2827-2836 (1999).

Hoa et al., "Preparation of porous materials with ordered hole structure", *Advances in Colloid and Interface Science*, 121, 9-23 (2006).

Holland et al., "Synthesis of Highly Ordered, Three-Dimensional, Macroporous Structures of Amorphous or Crystalline Inorganic Oxides, Phosphates, and Hybrid Composites", *Chemistry of Materials*, 11, 795-805 (1999).

Jiang et al., "Large-Scale Fabrication of Wafer-Size Colloidal Crystals, Macroporous Polymers and Nanocomposites by Spin-Coating", *Journal of American Chemical Society*, 126, 13778-13786 (2004).

Jiang et al., "Single-Crystal Colloidal Multilayers of Controlled Thickness", *Chemistry of Materials*, 11, 2132-2140 (1999).

Jiang et al., "Template-Directed Preparation of Macroporous Polymers with Oriented and Crystalline Arrays of Voids", *Journal of American Chemical Society 121*, 11630-11637 (1999).

Johnson et al., "Ordered Mesoporous Polymers of Tunable Pore Size from Colloidal Silica Templates", *Science Magazine*, 283, 963-965 (1999).

Kellenberger et al., "Soluble nanoparticles as removable pore templates for the preparation of polymer ultrafiltration membranes", *Journal of Membrane Science*, 387-388, 76-82 (2012)r.

Li et al., "Preparation of mesoporous calcium doped silica spheres with narrow size dispersion and their drug loading and degradation behavior", *Microporous and Mesoporous Materials*, 102, 151-158 (2007).

Mitchell et al., "Iron(III)-Doped, Silica Nanoshells: A Biodegradable Form of Silica", *Journal of American Chemical Society*, 134, 13997-14003 (2012).

Park et al.. "Fabrication of Three-Dimensional Macroporous Membranes with Assemblies of Microspheres as Templates", *Chemistry of Materials*, 10, 1745-1747 (1998).

Park et al., "Macroporous Membranes with Highly Ordered and Three-Dimensionally Interconnected Spherical Pores", *Advanced Materials*, 10, 1045-1048 (1998).

Stein et al., "Colloidal crystal templating of three-dimensionally ordered macroporous solids: materials for photonics and beyond", *Current Opinion in Solid State and Materials Science*, 5, 553-564 (2001).

Stein, A., "Sphere templating methods for periodic porous solids", *Microporous and Mesoporous Materials*, 44-45, 227-239 (2001).

Ulbricht, M., "Advanced functional polymer membranes", *Polymer*, 47, 2217-2262 (2006).

Velev et al., "Colloidal crystals as templates for porous materials", *Current Opinion in Colloid and Interface Science*, 5, 56-63 (2000)

Velev et al., "Structured Porous Materials viz Colloidal Crystal Templating: From Inorganic Oxides to Metals", *Advanced Materials*, 12, 531-534 (2000).

Wachner et al., "Utilising Spontaneous Self-Organization of Particles to Prepare Asymmetric, Hierarchical Membranes Comprising Microsieve-Like Parts", *Advanced Materials*, 25, 278-283 (2013).

Wang et al., "Inverse colloidal crystal microfiltration membranes", *Journal of Membrane Science*, 365, 302-310 (2010).

Wong et al., "Colloidal Crystal Films: Advances in Universality and Perfection", *Journal of American Chemical Society*, 125, 15589-15598 (2003).

Xia et al., "Monodispersed Colloidal Spheres: Old Materials with New Applications", *Advanced Materials*, 12, 693-713 (2000).

Xu et al., "Polymer-Silica Hybrid Monolayers as Precursors for Ultrathin Free-Standing Porous Membranes", *Langmuir*, 18, 2363-2367 (2002).

Yan et al., "A Simple and Effective Method for the Preparation of Porous Membranes with Three-Dimensionally Arranged Pores", *Advanced Materials*, 16, 911-915 (2004).

(56) References Cited

OTHER PUBLICATIONS

Yan et al., "Hierarchically Struchtured Assembly of Polymer Microsieves, made by a Combination of Phase Separation Micromolding and Float-Casting", *Advanced Materials*, 24, 1551-1557 (2012).

Yan et al., "Polymer Membranes with Two-Dimensionally Arranged Pores Derived from Monolayers of Silica Particles", *Chemistry of Materials*, 16, 1622-1626 (2004).

Zakhidov et al., "Carbon Structures with Three-Dimensional Periodicity at Optical Wavelengths", *Science Magazine*, 282, 897-901 (1998).

European Patent Office, Extended European Search Report in European Patent Application No. 15152688.6 (mailed Jul. 14, 2015).

Kellenberger, C., et al., "Soluble nanoparticles as removable pore templates for the preparation of polymer ultrafiltration membranes," *Journal of Membrane Science*, vol. 387, pp. 76-82 (2012).

Liu, H., et al., "A hard-template process to prepare three-dimensionally macroporous polymer electrolyte for lithium-ion batteries," *Electrochimica Acta*, vol. 121, pp. 328-336 (indicates available online Jan. 15, 2014).

Munakata, H., et al., "Three-dimensionally ordered macroporous polyimide composite membrane with controlled pore size for direct methanol fuel cells," *Journal of Power Sources*, vol. 178, pp. 596-602 (2008).

Weber, J., et al., "Mesoporous Poly(benzimidazole) Networks via Solvent Mediated Templating of Hard Spheres," *Macromolecules*, vol. 40, pp. 1299-1304 (2007).

Wilke, A., et al., "Mesoporous Polymer Networks-Ultraporous DVB Resins by Hard-Templating of Close-Packed Silica Spheres," *Macromolecular Rapid Communications*, vol. 33, pp. 785-790 (2012).

Wu, D., et al., "Design and Preparation of Porous Polymers," *Chemical Reviews*, vol. 112, pp. 3959-4015 (2012).

* cited by examiner

Surface in contact with patterned PP support

Surface in contact with patterned PP support

Free surface during casting (not in contact with patterned PP support)

POROUS POLYMERIC MEMBRANE WITH HIGH VOID VOLUME

BACKGROUND OF THE INVENTION

Polymeric membranes are used to filter a variety of fluids. However, there is a need for membranes that provide high throughput performance.

The present invention provides for ameliorating at least some of the disadvantages of the prior art. These and other advantages of the present invention will be apparent from the description as set forth below.

BRIEF SUMMARY OF THE INVENTION

An embodiment of the invention provides a microporous membrane comprising a single integral layer having (i) a first microporous surface; (ii) a second microporous surface; wherein at least the first microporous surface comprises a patterned surface comprising a plurality of peaks and valleys, the patterned surface comprising a plurality of first region surfaces comprising the peaks and a plurality of second region surfaces comprising the valleys; and, (iii) a porous bulk between the first microporous surface and the second microporous surface, the porous bulk comprising a plurality of first region bulks and a plurality of second region bulks; (a) the first region bulks extending from the respective first region surfaces toward the second microporous surface, the first region bulks comprising a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a first polymer matrix supporting the first set of pores, wherein the first controlled pore size is greater than the second controlled pore size; (b) the second region bulks extending from the respective second region surfaces toward the second microporous surface, the second region bulks comprising a third set of pores having outer rims, prepared by removing introduced dissolvable silica nanoparticles, the third set of pores having a third controlled pore size, and a fourth set of pores connecting the outer rims of the third set of pores, the fourth set of pores having a fourth controlled pore size, and a second polymer matrix supporting the third set of pores, wherein the third controlled pore size is greater than the fourth controlled pore size.

In accordance with other embodiments of the invention, filters and filter devices comprising the membranes, as well of methods of making and using the membranes, are provided.

BRIEF DESCRIPTION OF THE SEVERAL VIEWS OF THE DRAWING(S)

FIG. 1 is a scanning electron micrograph (SEM) showing a surface view of the first region of an embodiment of a membrane according to the present invention, showing a first set of pores having connecting outer rims (one pore highlighted in dashed lines), and a second set of pores (one pore highlighted in solid line) located in the connecting outer rims of the first set of pores.

Figure 2:
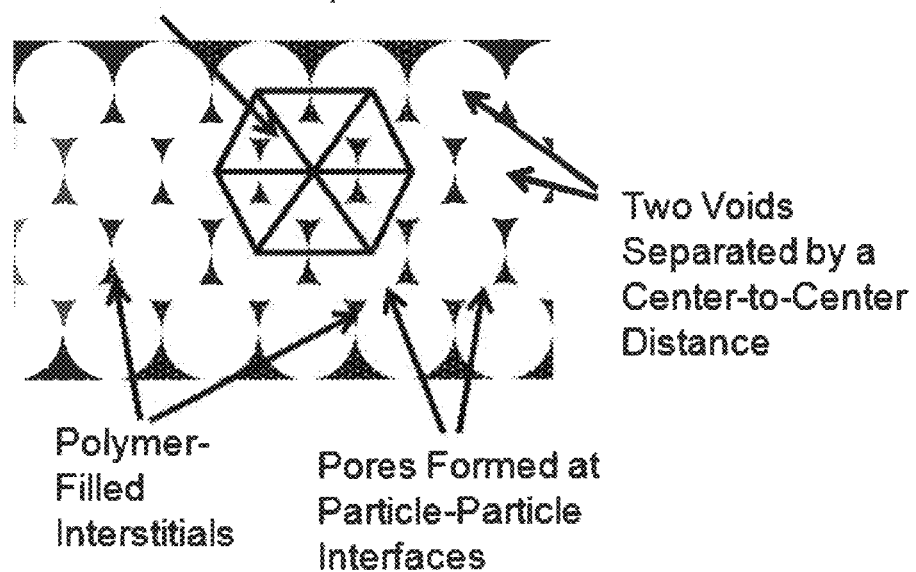

FIG. 2 illustrates hexagonal packing of the first set of pores (formed by dissolving of particles) in the first region of a membrane according to an embodiment of the invention, wherein the hexagonal packing is 74 volume percent. FIG. 2 also illustrates the matrix ("polymer formed interstitials") supporting the first set of pores, and the second set of pores connecting the outer rims of the first set of pores.

Figure 3:
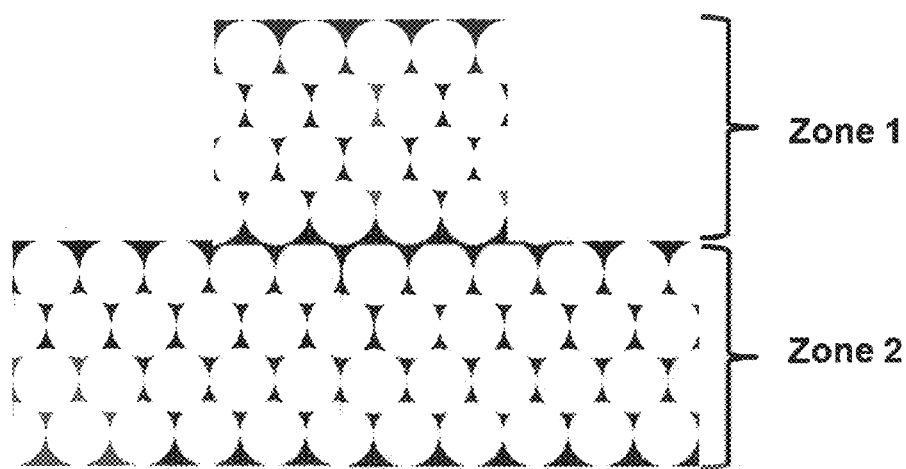

FIG. 3 diagrammatically illustrates a cross-section view of a membrane according to an embodiment of the present invention, showing a patterned surface of a membrane comprising a peak and a plurality of valleys, a first region surface comprising the peak and a second region surface comprising the valleys; and, a porous bulk between the patterned surface and the other membrane surface, the porous bulk comprising a first region bulk and a plurality of second region bulks; the first region bulk extending from the first region surface to the other membrane surface, the first region bulk comprising a first set of pores having outer rims, prepared by removing introduced dissolvable nanoparticles, the first set of pores having a first controlled pore size, and a second set of pores connecting the outer rims of the first set of pores, the second set of pores having a second controlled pore size, and a first polymer matrix supporting the first set of pores, wherein the first controlled pore size is greater than the second controlled pore size; the second region bulks extending from the respective second region surfaces to the other membrane surface, the second region bulks comprising a third set of pores having outer rims, prepared by removing introduced dissolvable nanoparticles, the third set of pores having a third controlled pore size, and a fourth set of pores connecting the outer rims of the third set of pores, the fourth set of pores having a fourth controlled pore size, and a second polymer matrix supporting the third set of pores, wherein the third controlled pore size is greater than the fourth controlled pore size, wherein the first controlled pore size is substantially the same as the third controlled pore size.

Figure 4:
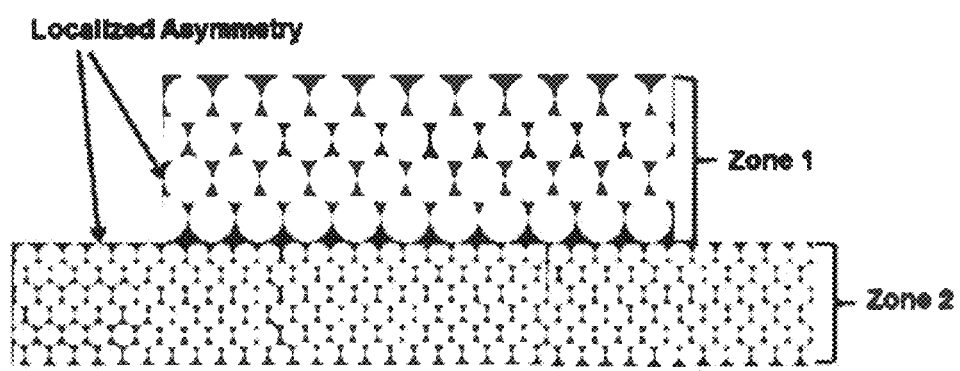

FIG. 4 diagrammatically illustrates a cross-section view of a membrane according to another embodiment of the present invention, showing a patterned surface of a membrane comprising a plurality of peaks and a plurality of valleys, a first region surface comprising the peaks and a second region surface comprising the valleys; and, a porous bulk between the patterned surface and the other membrane surface, the porous bulk comprising a first region bulk and a plurality of second region bulks; the first region bulks extending from the respective first region surfaces to the other membrane surface, the first region bulks comprising a first set of pores having outer rims, prepared by removing introduced dissolvable nanoparticles, the first set of pores having a first controlled pore size, and a second set of pores connecting the outer rims of the first set of pores, the second set of pores having a second controlled pore size, and a first polymer matrix supporting the first set of pores, wherein the first controlled pore size is greater than the second controlled pore size; the second region bulks extending from the respective second region surfaces to the other membrane surface, the second region bulks comprising a third set of pores having outer rims, prepared by removing introduced dissolvable nanoparticles, the third set of pores having a third controlled pore size, and a fourth set of pores connecting the outer rims of the third set of pores, the fourth set of pores having a fourth controlled pore size, and a second polymer matrix supporting the third set of pores, wherein the third controlled pore size is greater than the fourth controlled pore size, wherein the first controlled pore size is less than the third controlled pore size.

Figure 5A:
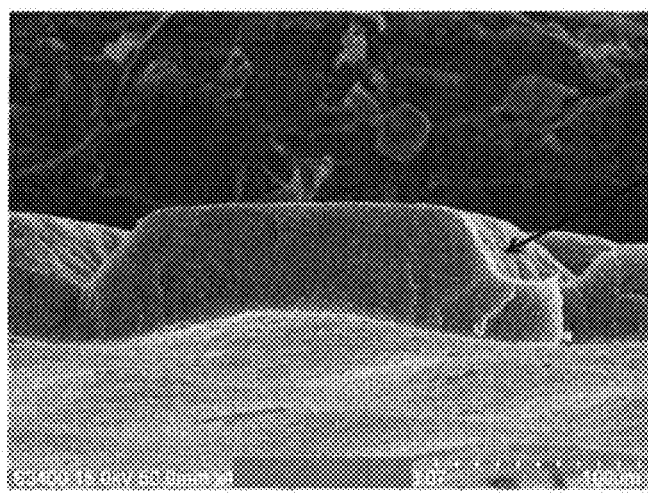
Figure 5B:
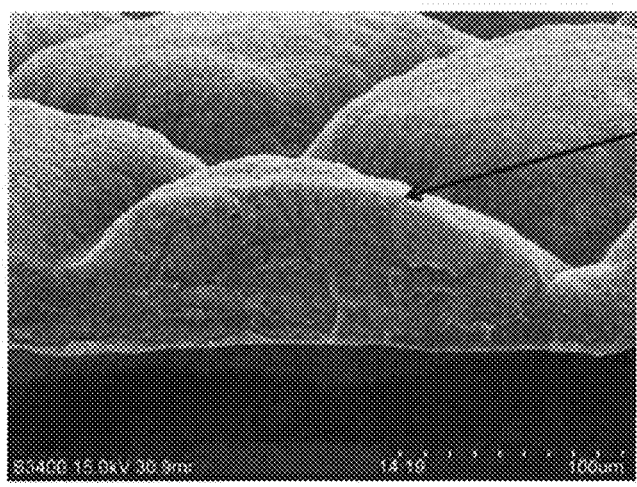
Figure 5C:
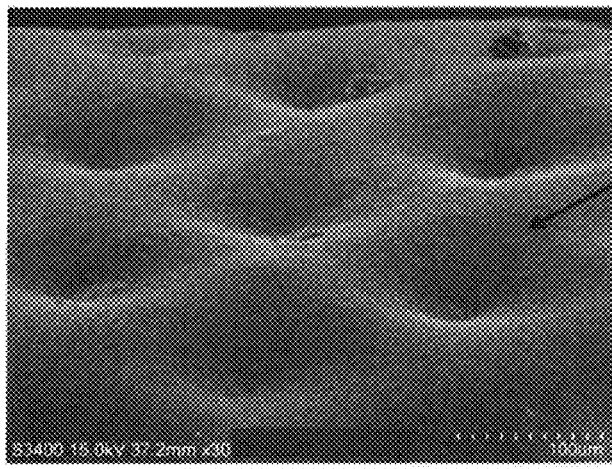

FIGS. 5A, 5B, and 5C are SEMs showing a cross-sectional view (FIG. 5A; showing the patterned substrate-contacting surface of the membrane), a surface view (FIG. 5B; showing the patterned substrate-contacting surface of the membrane) and a surface view (FIG. 5C; showing the free or non-patterned substrate-contacting surface of the membrane) of a membrane according to another embodiment of the present invention.

Figure 6:
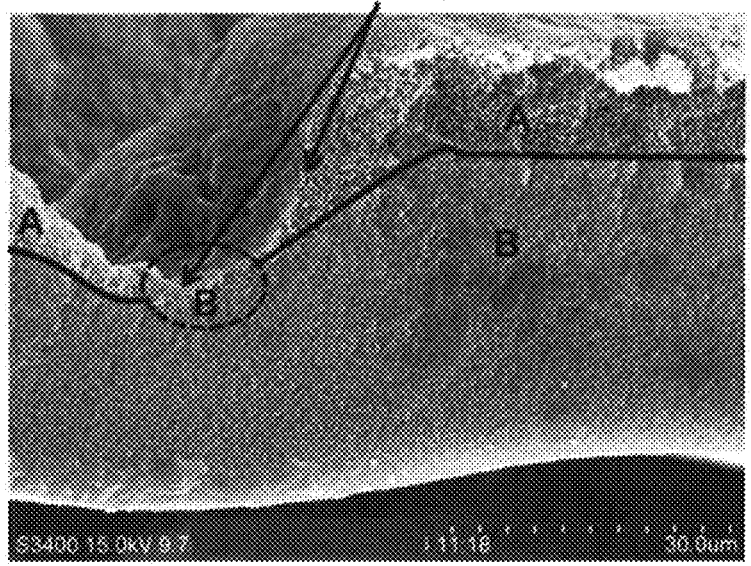

FIG. 6 is an SEM showing an enlarged partial cross-sectional view of a membrane according to another embodiment of the present invention, showing a first region bulk comprising a first controlled pore size of about 570 nm and a second region bulk comprising a third controlled pore size of about 310 nm.

DETAILED DESCRIPTION OF THE INVENTION

An embodiment of the invention provides a microporous membrane comprising a single integral layer having (i) a first microporous surface; (ii) a second microporous surface; wherein at least the first microporous surface comprises a patterned surface comprising a plurality of peaks and valleys, the patterned surface comprising a plurality of first region surfaces comprising the peaks and a plurality of second region surfaces comprising the valleys; and, (iii) a porous bulk between the first microporous surface and the second microporous surface, the porous bulk comprising a plurality of first region bulks and a plurality of second region bulks; (a) the first region bulks extending from the respective first region surfaces toward the second microporous surface, the first region bulks comprising a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a first polymer matrix supporting the first set of pores, wherein the first controlled pore size is greater than the second controlled pore size; (b) the second region bulks extending from the respective second region surfaces toward the second microporous surface, the second region bulks comprising a third set of pores having outer rims, prepared by removing introduced dissolvable silica nanoparticles, the third set of pores having a third controlled pore size, and a fourth set of pores connecting the outer rims of the third set of pores, the fourth set of pores having a fourth controlled pore size, and a second polymer matrix supporting the third set of pores, wherein the third controlled pore size is greater than the fourth controlled pore size.

In accordance with an embodiment, the controlled pore size of the first set of pores (and/or the controlled pore size of another set of pores prepared by removing introduced silica nanoparticles) is in the range of from about 50 nm to about 1000 nm, for example, from about 160 nm to about 630 nm. Thus, for example, the pore size of the first set of pores is about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

In an embodiment, the second controlled pore size in the first region bulk (or the controlled pore size in any other region with respect to the pores connecting pores having outer rims) is in a ratio in the range of about 0.2 to about 0.4 times the first controlled pore size (or the controlled pore size with respect to pores having outer rims).

The third controlled pore size can be substantially the same as the first controlled pore size, or the third controlled pore size can be at least about 10% less than the first controlled pore size, or the third controlled pore size can be at least about 10% greater than the first controlled pore size. For example, in an embodiment, the pore size of the third set of pores is at least 10%, for example, 20%, 30%, 40%, 50%, 60%, 70%, or 80%, different from the pore size of the first set of pores. The pore size of the third set of pores can be larger or smaller than the pore size of the first set of pores.

In some embodiments, the controlled pore size of pores having outer rims in the first region bulks is greater than the controlled pore size of pores having outer rims in the second region bulks, e.g., wherein the second region bulks comprise retentive portions of the membrane. In some other embodiments, the controlled pore size of pores having outer rims in the first region bulks is less than the controlled pore size of pores having outer rims in the second region bulks, e.g., wherein the first region bulks comprise retentive portions of the membrane.

In some embodiments of the membrane, the second region bulks extend from the respective second region surfaces to the second surface.

In some embodiments of the membrane, the first region bulks extend from the respective first region surfaces to the second surface, and the second region bulks extend from the respective second region surfaces to the second surface.

In an embodiment, the second surface comprises a second patterned surface comprising a plurality of peaks and valleys, the second patterned surface comprising a plurality of third region surfaces comprising the peaks and a plurality of fourth region surfaces comprising the valleys.

In accordance with the invention, the peaks and valleys can have any suitable shape, e.g., the peaks and valleys do not require pointed tips or depressions, e.g., they can have a rounded shape at the top and/or bottom and/or an elevated and fairly level top and/or bottom.

Advantageously, membranes with patterns of peaks and valleys (e.g., "localized asymmetries") have greater resistance to fouling than conventional membranes.

Membranes according to the invention are integral (the membrane behaves as a single structure that does not delaminate or separate under normal use conditions). For example, while making the membranes, portions of each bulk can infiltrate each other and mix.

Typically, in any region having a controlled pore size comprising pores with outer rims, prepared by removing introduced dissolvable silica nanoparticles, and an additional controlled pore size comprising smaller pores connecting the outer rims of the pores, the controlled pore size of the smaller pores is in a ratio in the range of about 0.2 to about 0.4 times, the controlled pore size of the larger pores.

In an embodiment, the membrane is prepared by introducing dissolvable silica nanoparticles into solutions comprising one or more membrane forming polymers (typically, the membrane forming polymers are dissolved in a solvent or mixture of solvents), casting the nanoparticle-containing polymer solution (preferably, casting the nanoparticle-containing polymer solution on a substrate, preferably a patterned substrate, carrying out phase inversion of the nanoparticle-containing polymer solution to provide a membrane, subsequently dissolving the nanoparticles, and washing the resultant membrane. In some embodiments, at least first and second casting solutions comprising dissolvable nanoparticles in one or more membrane forming polymers are cast, e.g., the first casting solution is cast on a patterned substrate, and the second casting solution is cast on the first casting solution, and phase inversion is carried out, followed by dissolving the nanoparticles and washing the resultant membrane.

Illustratively, an embodiment of the invention comprises (a) casting a (first) dissolvable silica nanoparticle-containing polymer solution onto a patterned substrate (optionally, wherein the substrate has been coated with a preconditioning material before casting); (a$^1$) optionally, casting a second dissolvable silica nanoparticle-containing polymer solution onto the cast solution of (a); (b) carrying out phase inversion and obtaining a membrane comprising at least one patterned microporous surface; (c) dissolving the nanoparticles and obtaining a nanoparticle-depleted membrane; and (d) washing the nanoparticle-depleted membrane.

In some embodiments, the method comprises exposing the nanoparticle-containing polymer solution(s) to a temperature in the range of from about 40° C. to about 80° C. for a period in the range of from about 1 minute to about 2 hours.

Advantageously, membranes according to the invention can be produced using preformed polymers such as polyethersulfone (PES), polyvinylidene fluoride (PVDF), and polyacrylonitrile (PAN), that are commonly used in commercial membranes. Additionally, the nanoparticles can be dissolved without using hydrofluoric acid, for example, the nanoparticles can be dissolved using safer, more environmentally benign solvents.

In other embodiments, filters and filter devices are provided, the filter and filter devices comprising at least one membrane.

A method of filtering fluid is also provided in accordance with another embodiment of the invention, the method comprising passing the fluid through at least one membrane, or a filter comprising at least one membrane, as described above.

In some embodiments, at least the first microporous surface of the membranes has a rough surface comprising an Ra (arithmetic mean value of roughness, e.g., as determined according to ASME B 46.1-2002, "Surface Texture, Surface Roughness, Waviness and Lay") of at least about 1 μm, in some embodiments, at least about 2 μm, or in the range of from about 1 μm to about 3 μm.

As will be described in more detail below, dissolving the particles creates a first set of pores in the membranes, the first set of pores having outer rims, and located within the outer rims is a second set of pores. As illustrated in FIG. 1, the dashed line highlights an outer rim of a pore in the first set, and the solid line highlights a pore in the second set. The second set of pores allows communication (e.g., fluid flow) from the void within one outer rim into the void of another outer rim.

A variety of dissolvable silica nanoparticles are suitable for use in preparing membranes according to embodiments of the invention. Preferably, the dissolvable particles are not pure silica. Typically, the particles comprise silica nanoparticles ranging in diameter from about 50 nm to about 1000 nm. In an embodiment, the particles comprise silica nanoparticles ranging in diameter from about 50 nm to about 1000 nm, having a density of 1.96 g/cm$^3$ or less. In some embodiments, the silica nanoparticles have a particle density of about 1.93 to about 1.96 g/cm$^3$.

The silica nanoparticles can have a particle size, e.g., diameter, of less than 1000 nm, in particular a particle size of from about 160 nm to about 630 nm. Thus, for example, the nanoparticles have a particle size of about 160 nm, about 180 nm, about 200 nm, about 220 nm, about 240 nm, about 260 nm, about 280 nm, about 300 nm, about 320 nm, about 340 nm, about 360 nm, about 380 nm, about 400 nm, about 420 nm, about 440 nm, about 460 nm, about 480 nm, about 500 nm, about 520 nm, about 540 nm, about 560 nm, about 580 nm, about 600 nm, or about 620 nm.

The silica nanoparticles can be prepared by a method comprising: (a) reacting an orthosilicate and an alcohol or a mixture of alcohols in an aqueous medium in the presence of a salt of a metal of Group Ia or Group IIa, or in the presence of a metalloid compound, optionally in combination with ammonium hydroxide, (b) isolating the resulting nanoparticles, and (c) treating the nanoparticles from (b) with an acid.

In an embodiment, the nanoparticles can be included in the coating composition prior to the acid treatment (c).

In an embodiment, the orthosilicate used in the preparation of the nanoparticles is a tetraalkylorthosilicate. Examples of tetraalkylorthosilicates tetramethylorthosilicate, tetraethylorthosilicate, tetrapropylorthosilicate, tetrabutylorthosilicate, and tetrapentylorthosilicate.

Any suitable alcohol or mixture of alcohols can be used in the preparation of the nanoparticles, for example, the alcohol or mixture of alcohols is selected from methanol, ethanol, propanol, butanol, and mixtures thereof.

The salt of the metal used in the preparation of the nanoparticles can be selected from salts of lithium, sodium, potassium, cesium, magnesium, and calcium. In an embodiment, the salt of the metal is selected from lithium acetate, sodium acetate, sodium metasilicate, sodium formate, potassium acetate, cesium acetate, magnesium acetate, and calcium acetate. In another embodiment, the metalloid compound is a compound of boron, for example, boric acid or a boric acid ester such as alkyl borate. The alkyl borate can be a trialkyl borate such as trimethyl borate or triethyl borate.

The acid employed in (c) of the method above can be a mineral acid or organic acid. Examples of mineral acids include hydrochloric acid, sulfuric acid, and nitric acid, preferably hydrochloric acid or sulfuric acid. Examples of organic acids include acetic acid, formic acid, trifluoroacetic acid, trichloroacetic acid, and p-toluenesulfonic acid, preferably formic acid. The nanoparticles isolated in (b) can be treated with a 1N to 2N acid, e.g., 1N HCl, or 10-50% weight % organic acid in water, e.g., 50% aqueous formic acid, for a period of about 0.5 hr to about 3 hr, preferably about 1 hr to 2 hr. For example, the nanoparticles can be sonicated in an acid bath for the above period. Following the acid treatment, the nanoparticles are isolated from the acid and washed with deionized water and dried under vacuum to obtain the silica nanoparticles.

Illustratively, silica nanoparticles can be prepared as follows. In a 6 L jacketed flask kept at 25° C., 4.8 g lithium acetate dihydrate (LiOAc.2H$_2$O), 2480 mL deionized water (DI-H$_2$O), 2.9 L anhydrous ethanol (EtOH), and 120 mL 28% w/w NH$_3$ in water is stirred for 30 min at 200 rpm using an overhead mixer with PTFE impellers. A solution of 300 mL EtOH with 200 mL tetraethylorthosilicate (TEOS), which is prepared under dry conditions (<10% relative humidity), is rapidly poured into the 6 L flask, and mixing is increased to 400 rpm and a dry air purge (<1% relative humidity) is utilized for 5 min. Mixing is reduced to 200 rpm, the dry air purge is removed, the flask is sealed, and the reaction continues for a total of 1 h. The particles are purified by centrifugation and re-suspension in EtOH three times.

Typical stock solutions comprising the dissolvable nanoparticles, preferably purified dissolvable nanoparticles, comprise the nanoparticles dispersed at concentrations in the range of from about 30 wt % to about 65 wt % dimethyl formamide (DMF), with in the range of from about 0.001% to about 0.1% triethanolamine (TEA).

A variety of procedures are suitable for dissolving the particles. As noted above, the process should avoid using hydrofluoric acid; rather, the nanoparticles should be dissolved using safer, more environmentally benign solvents. For example, the nanoparticle-containing membrane can be placed in a mineral acid (e.g., HCl or $H_2SO_4$) at a concentration in the range of about 0.1 to about 2 moles/L for a period in the range of from about 1 minute to about 1 hour, followed by immersion in an alkaline solution (e.g., KOH or NaOH) at a concentration in the range of about 0.1 to about 4 moles/L for a period in the range of from about 30 minutes to about 24 hours, followed by washing in water (e.g., DI water) for a period in the range of about 30 minutes to about 4 hours. If desired, the membrane can subsequently be dried, e.g., in an oven at a temperature in the range of from about 40° C. to about 80° C. for a period in the range of about 30 minutes to about 2 hours.

Typically, the phase inversion process for producing the membrane involves casting or extruding a polymer solution into a thin film on a substrate, and precipitating the polymer(s) through one or more of the following: (a) evaporation of the solvent and nonsolvent, (b) exposure to a non-solvent vapor, such as water vapor, which absorbs on the exposed surface, (c) quenching in a non-solvent liquid (e.g., a phase immersion bath containing water, and/or another non-solvent or solvent), and (d) thermally quenching a hot film so that the solubility of the polymer is suddenly greatly reduced. Phase inversion can be induced by the wet process (immersion precipitation), vapor induced phase separation (VIPS), thermally induced phase separation (TIPS), quenching, dry-wet casting, and solvent evaporation (dry casting). Dry phase inversion differs from the wet or dry-wet procedure by the absence of immersion coagulation. In these techniques, an initially homogeneous polymer solution becomes thermodynamically unstable due to different external effects, and induces phase separation into a polymer lean phase and a polymer rich phase. The polymer rich phase forms the matrix of the membrane, and the polymer lean phase, having increased levels of solvents and non-solvents, forms pores.

A membrane-forming polymer solution is prepared by dissolving the polymer in a solvent or a mixture of solvents. A variety of polymer solutions are suitable for use in the invention (e.g., for preparing the first and/or second regions), and are known in the art. Suitable polymer solutions can include, polymers such as, for example, polyaromatics; sulfones (e.g., polysulfones, including aromatic polysulfones such as, for example, polyethersulfone (PES), polyether ether sulfone, bisphenol A polysulfone, polyarylsulfone, and polyphenylsulfone), polyamides, polyimides, polyvinylidene halides (including polyvinylidene fluoride (PVDF)), polyolefins, such as polypropylene and polymethylpentene, polyesters, polystyrenes, polycarbonates, polyacrylonitriles ((PANs) including polyalkylacrylonitriles), cellulosic polymers (such as cellulose acetates and cellulose nitrates), fluoropolymers, and polyetherether ketone (PEEK). Polymer solutions can include a mixture of polymers, e.g., a hydrophobic polymer (e.g., a sulfone polymer) and a hydrophilic polymer (e.g., polyvinylpyrrolidone (PVP)).

In addition to one or more polymers, typical polymer solutions comprise at least one solvent, and may further comprise at least one non-solvent. Suitable solvents include, for example, dimethyl formamide (DMF); N,N-dimethylacetamide (DMAC); N-methyl pyrrolidone (NMP); dimethyl sulfoxide (DMSO), methyl sulfoxide, tetramethylurea; dioxane; diethyl succinate; chloroform; and tetrachloroethane; and mixtures thereof. Suitable nonsolvents include, for example, water; various polyethylene glycols (PEGs; e.g., PEG-200, PEG-300, PEG-400, PEG-1000); various polypropylene glycols; various alcohols, e.g., methanol, ethanol, isopropyl alcohol (IPA), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; acids, such as acetic acid, citric acid, and lactic acid; and various salts, such as calcium chloride, magnesium chloride, and lithium chloride; and mixtures thereof.

If desired, a solution comprising a polymer can further comprise, for example, one or more polymerization initiators (e.g., any one or more of peroxides, ammonium persulfate, aliphatic azo compounds (e.g., 2,2'-azobis(2-amidinopropane) dihydrochloride (V50)), and combinations thereof), and/or minor ingredients such as surfactants and/or release agents.

Typical stock solutions including a polymer (before combining with a solution comprising the dissolvable nanoparticles) comprise in the range of from about 10 wt % to about 35 wt % resin (e.g., PES, PVDF, or PAN), in the range of from about 0 to about 10 wt % PVP, in the range of from about 0 to about 10 wt % PEG, in the range of from about 0 to about 90 wt % NMP, in the range of from about 0 to about 90 wt % DMF, and in the range of from about 0 to about 90 wt % DMAC.

Suitable components of solutions are known in the art. Illustrative solutions comprising polymers, and illustrative solvents and nonsolvents include those disclosed in, for example, U.S. Pat. Nos. 4,340,579; 4,629,563; 4,900,449; 4,964,990, 5,444,097; 5,846,422; 5,906,742; 5,928,774; 6,045,899; 6,146,747; and 7,208,200.

While a variety of polymeric membranes can be produced in accordance with the invention, in preferred embodiments, the membranes are sulfone membranes (more preferably, polyethersulfone membranes and/or polyarylsulfone membranes), acrylic membranes (e.g., (PANs, including polyalkylacrylonitriles), or semi-crystalline membranes (for example, PVDF membranes and/or polyamide membranes).

The membranes can be cast manually (e.g., poured, cast, or spread by hand onto the substrate) or automatically (e.g., poured or otherwise cast onto a moving bed having the substrate thereon).

A variety of casting techniques, including multiple casting techniques, are known in the art and are suitable. A variety of devices known in the art can be used for casting. Suitable devices include, for example, mechanical spreaders, that comprise spreading knives, doctor blades, or spray/pressurized systems. One example of a spreading device is an extrusion die or slot coater, comprising a casting chamber into which the casting formulation (solution comprising a polymer) can be introduced and forced out under pressure through a narrow slot. Illustratively, the solutions comprising polymers can be cast by means of a doctor blade with knife gaps in the range from about 100 micrometers to about 500 micrometers, more typically in the range from about 120 micrometers to about 400 micrometers.

A variety of casting speeds are suitable as is known in the art. Typically, the casting speed is at least about 3 feet per minute (fpm), more typically in the range of from about 3 to about 40 fpm, in some embodiments, at least about 5 fpm.

A variety of substrates having patterns are suitable for preparing membranes according to embodiments of the invention. For example, the substrate (which can be hydrophilic or hydrophobic) can be made of a fabric (woven or non-woven), embossed foil, metal screen, extruded mesh, textured rubber, embossed polymer film, and various polymer materials, e.g., wherein the substrate has a pattern providing a template of peaks and valleys.

In some embodiments, the surfaces of the patterned substrates or patterned supports can be modified by applying preconditioning material as a coating before coating the substrate with the casting solution. Without being bound to any particular theory, it is believed that, with respect to some substrates and supports, such preconditioning can facilitate adhesion to the patterned substrate/support as well as assist in subsequent release of the membrane from the substrate/support.

Preferably, the preconditioning material is compatible with membrane processing temperatures, sufficiently adheres to the cast film during thermal processing that it does not delaminate, and dissolves readily in solvents that do not dissolve the membrane resin (such that the membrane can be released from the substrate/support and/or the preconditioning material can be completely removed after membrane fabrication). Examples of suitable preconditioning materials include various polyethylene glycols (PEGs; e.g., PEG-400, PEG-1000); polyvinylpyrrolidone (PVP), poly(acrylic acid), and poly(methacrylic acid); various alcohols, especially low alcohols, e.g., methanol, ethanol, isopropyl alcohol (IPA), polyvinyl alcohol (PVOH), amyl alcohols, hexanols, heptanols, and octanols; alkanes, such as hexane, propane, nitropropane, heptanes, and octane; and ketone, ethers and esters such as acetone, butyl ether, ethyl acetate, and amyl acetate; and various salts, such as calcium chloride, magnesium chloride, and lithium chloride; and mixtures thereof.

The membranes can have any suitable pore structure, e.g., a pore size (for example, as evidenced by bubble point, or by $K_L$ as described in, for example, U.S. Pat. No. 4,340,479, or evidenced by capillary condensation flow porometry), a mean flow pore (MFP) size (e.g., when characterized using a porometer, for example, a Porvair Porometer (Porvair plc, Norfolk, UK), or a porometer available under the trademark POROLUX (Porometer.com; Belgium)), a pore rating, a pore diameter (e.g., when characterized using the modified OSU F2 test as described in, for example, U.S. Pat. No. 4,925,572), or removal rating media. The pore structure used depends on the size of the particles to be utilized, the composition of the fluid to be treated, and the desired effluent level of the treated fluid.

Additionally, the membranes have a desirable hexagonal structure resulting from the first set of pores in the bulk of the membrane. As illustrated in FIG. 2 (showing the first set of pores resulting from dissolving the introduced particles and the hexagonal structure representing the maximum void fraction), the maximum void fraction is 74 volume percent, and membranes according to embodiments of the invention have in the range of from about 66% to about 73% void fraction.

The microporous surfaces of the membranes can have any suitable mean pore size, e.g., as determined by, for example, calculating the average surface pore size from an SEM at 5,000× or 20,000× magnification.

Typically, the thickness of membranes according to embodiments of the invention (from the peaks on one surface to the top of the other surface (that may include peaks) is in the range of about 1 mil to about 8 mils, preferably, in the range of from about 3 mils to about 5 mils.

The membrane can have any desired critical wetting surface tension (CWST, as defined in, for example, U.S. Pat. No. 4,925,572). The CWST can be selected as is known in the art, e.g., as additionally disclosed in, for example, U.S. Pat. Nos. 5,152,905, 5,443,743, 5,472,621, and 6,074,869. Typically, the membrane has a CWST of greater than about 70 dynes/cm (about $70\times10^{-5}$N/cm), more typically greater than about 73 dynes/cm (about $73\times10^{-5}$N/cm), and can have a CWST of about 78 dynes/cm (about $78\times10^{-5}$N/cm) or more. In some embodiments, the membrane has a CWST of about 82 dynes/cm (about $82\times10^{-5}$N/cm) or more.

The surface characteristics of the membrane can be modified (e.g., to affect the CWST, to include a surface charge, e.g., a positive or negative charge, and/or to alter the polarity or hydrophilicity of the surface) by wet or dry oxidation, by coating or depositing a polymer on the surface, or by a grafting reaction. Modifications include, e.g., irradiation, a polar or charged monomer, coating and/or curing the surface with a charged polymer, and carrying out chemical modification to attach functional groups on the surface. Grafting reactions may be activated by exposure to an energy source such as gas plasma, vapor plasma, corona discharge, heat, a Van de Graff generator, ultraviolet light, electron beam, or to various other forms of radiation, or by surface etching or deposition using a plasma treatment.

A variety of fluids can be filtered in accordance with embodiments of the invention. Membranes according to embodiments of the invention can be used in a variety of applications, including, for example, diagnostic applications (including, for example, sample preparation and/or diagnostic lateral flow devices), ink jet applications, filtering fluids for the pharmaceutical industry, filtering fluids for medical applications (including for home and/or for patient use, e.g., intravenous applications, also including, for example, filtering biological fluids such as blood (e.g., to remove leukocytes)), filtering fluids for the electronics industry (e.g., filtering photoresist fluids in the microelectronics industry), filtering fluids for the food and beverage industry, clarification, filtering antibody- and/or protein-containing fluids, filtering nucleic acid-containing fluids, cell detection (including in situ), cell harvesting, and/or filtering cell culture fluids. Alternatively, or additionally, membranes according to embodiments of the invention can be used to filter air and/or gas and/or can be used for venting applications (e.g., allowing air and/or gas, but not liquid, to pass therethrough). Membranes according to embodiments of the inventions can be used in a variety of devices, including surgical devices and products, such as, for example, ophthalmic surgical products.

In accordance with embodiments of the invention, the membrane can have a variety of configurations, including planar, pleated, and/or hollow cylindrical.

Membranes according to embodiments of the invention are typically disposed in a housing comprising at least one inlet and at least one outlet and defining at least one fluid flow path between the inlet and the outlet, wherein at least one inventive membrane or a filter including at least one inventive membrane is across the fluid flow path, to provide a filter device or filter module. In an embodiment, a filter device is provided comprising a housing comprising an inlet and a first outlet, and defining a first fluid flow path between the inlet and the first outlet; and at least one inventive membrane or a filter comprising at least one inventive membrane, the inventive membrane or filter comprising at least one inventive membrane being disposed in the housing across the first fluid flow path.

Preferably, for crossflow applications, at least one inventive membrane or filter comprising at least one inventive membrane is disposed in a housing comprising at least one inlet and at least two outlets and defining at least a first fluid flow path between the inlet and the first outlet, and a second fluid flow path between the inlet and the second outlet, wherein the inventive membrane or filter comprising at least one inventive membrane is across the first fluid flow path, to provide a filter device or filter module. In an illustrative embodiment, the filter device comprises a crossflow filter module, the housing comprising an inlet, a first outlet comprising a concentrate outlet, and a second outlet comprising a permeate outlet, and defining a first fluid flow path between the inlet and the first outlet, and a second fluid flow path between the inlet and the second outlet, wherein at least one inventive membrane or filter comprising at least one inventive membrane is disposed across the first fluid flow path.

The filter device or module may be sterilizable. Any housing of suitable shape and providing an inlet and one or more outlets may be employed.

The housing can be fabricated from any suitable rigid impervious material, including any impervious thermoplastic material, which is compatible with the fluid being processed. For example, the housing can be fabricated from a metal, such as stainless steel, or from a polymer, e.g., transparent or translucent polymer, such as an acrylic, polypropylene, polystyrene, or a polycarbonated resin.

The following examples further illustrate the invention but, of course, should not be construed as in any way limiting its scope.

EXAMPLES

In the following examples, dissolvable particles are prepared in stock solutions as described below.

Stock solutions having nanoparticles having diameters of approximately 570 nm are prepared as follows: Dissolvable particles are prepared in stock solution as follows: In a jacketed flask kept at 25° C., a solution is prepared consisting of 1 mol/L ammonia ($NH_3$), 8.24 mol/L ethanol (ETOH), 1 mol/L methanol (MeOH), 23.7 mol/L deionized (DI) water, 0.15 mol/L tetraethoxysilane (TEOS), and 0.0078 mol/L sodium metasilicate ($Na_2SiO_3$), and stirred at 200 rpm for 1 hr. Dynamic light scattering and SEM show particle diameters of approximately 570 nm. Particles are centrifuged, decanted, and re-suspended in ETOH twice. Then, the particles are centrifuged, decanted, and re-suspended in DMF along with 0.1% triethanolamine (TEA) three times. The stock solution has a final concentration of 60% (w/w) particles.

Stock solutions having nanoparticles having diameters of approximately 310 nm are prepared as follows: In a jacketed flask kept at 25° C., a solution is prepared consisting of 0.9 mol/L $NH_3$, 9.16 mol/L ETOH, 23.07 mol/L DI water, 0.15 mol/L TEOS, and 0.0078 mol/L lithium acetate ($CH_3COOLi$), and stirred at 200 rpm for 1 hr. Dynamic light scattering and SEM show particle diameters of approximately 310 nm. Particles are centrifuged, decanted, and re-suspended in ETOH twice. Then, the particles are centrifuged, decanted, and re-suspended in DMF along with 0.1% TEA three times. The stock solution has a final concentration of 60% (w/w) particles.

The substrate is in the Examples is embossed polypropylene ("PP") (BP100P, 5.0 mils; Bloomer Plastics Inc., Bloomer, Wis.).

In some examples, as described in more detail below, the embossed substrate is coated with PEG-400 to provide a preconditioned substrate, before a casting solution is cast thereon.

In the following examples, SEM analysis and porometry are used to determine the second controlled pore size of the second set of pores, that are located in the connections between the outer rims of the first set of pores, as well as to determine the fourth controlled pore size of the fourth set of pores, that are located in the connections between the outer rims of the third set of pores.

Example 1

This example demonstrates the preparation of a membrane according to an embodiment of the invention, the membrane comprising a single integral layer having (i) a first microporous surface; (ii) a second microporous surface; wherein the first microporous surface comprises a patterned surface comprising a plurality of peaks and valleys, the patterned surface comprising a plurality of first region surfaces comprising the peaks and a plurality of second region surfaces comprising the valleys; and, (iii) a porous bulk between the first microporous surface and the second microporous surface, the porous bulk comprising a plurality of first region bulks and a plurality of second region bulks; (a) the first region bulks extending from the respective first region surfaces toward the second microporous surface, the first region bulks comprising a first set of pores having outer rims, prepared by removing introduced dissolvable nanoparticles, the first set of pores having a first controlled pore size of about 570 nm, and a second set of pores connecting the outer rims of the first set of pores, the second set of pores having a second controlled pore size of about 171 nm, and a first polymer matrix supporting the first set of pores; (b) the second region bulks extending from the respective second region surfaces toward the second microporous surface, the second region bulks comprising a third set of pores having outer rims, prepared by removing introduced dissolvable nanoparticles, the third set of pores having a third controlled pore size of about 570 nm, and a fourth set of pores connecting the outer rims of the third set of pores, the fourth set of pores having a fourth controlled pore size of about 171 nm, and a second polymer matrix supporting the third set of pores, wherein the second region bulks extend from the respective second region surfaces to the second surface, and the second surface comprises a second patterned surface comprising a plurality of peaks and valleys, the second patterned surface comprising a plurality of third region surfaces comprising the peaks and a plurality of fourth region surfaces comprising the valleys.

A stock solution having nanoparticles having diameters of approximately 570 nm is prepared.

A polymer (resin) stock solution (to be combined with the particle stock solution) is prepared as follows: In a jacketed kettle kept at 47° C. using a circulating bath, 33% (w/w) PES resin (BASF, Ultrason E 6020 P), 2% PEG-400, 13% (w/w) NMP, and 52% (w/w) DMF are mixed at 800 rpm using an overhead mixer for 4 hr. The solution is placed under vacuum at 200 mbar for 30 minutes to deaerate the solution.

A casting solution is prepared as follows: The resin stock solution and the particle stock solution are combined in a flask and mixed at 30,000 rpm for 2 min with final concentrations of 40% (w/w) particles, 14% PES, 1% PEG-400, 5% NMP, 40% DMF, followed by deaeration at 200 mbar for 30 min.

Using a casting bar gapped to 5 mil, the casting solution is cast on a PEG-400 coated preconditioned polypropylene substrate and placed in an oven for 30 min. at 50° C., then immersed in DI water at 80° C. for 1 hr. The membrane is soaked in 1 mol/L HCl for 1 hr., followed by soaking in 2 mol/L KOH for 5 hr. Subsequently, the membrane is washed with DI water at 25° C. for 2 hr. and dried at 50° C. for 30 min.

The first surface of the membrane has an Ra of at least about 1 micrometer.

FIG. 3 is a diagrammatic view of the membrane, showing the porous bulk, wherein the membrane has a peak (top of zone 1) and a valley (top of zone 2). FIGS. 5A, 5B, and 5C are SEMs showing a cross-sectional view (FIG. 5A; showing the patterned substrate-contacting surface of the membrane), a surface view (FIG. 5B; showing the patterned substrate-contacting surface of the membrane) and a surface view (FIG. 5C; showing the free or non-patterned substrate-contacting surface of the membrane) of the membrane.

The peaks and valleys shown in FIGS. 5A-5C have rounded shapes at the bottom (valleys; shown on top and bottom surfaces), and the illustrated peaks on the top surface (FIGS. 5A-5B) are elevated with a fairly level plateau-like form along most of the peak.

Example 2

This example demonstrates the preparation of a membrane according to another embodiment of the invention, the membrane comprising a single integral layer having (i) a first microporous surface; (ii) a second microporous surface; wherein the first microporous surface comprises a patterned surface comprising a plurality of peaks and valleys, the patterned surface comprising a plurality of first region surfaces comprising the peaks and a plurality of second region surfaces comprising the valleys; and, (iii) a porous bulk between the first microporous surface and the second microporous surface, the porous bulk comprising a plurality of first region bulks and a plurality of second region bulks; (a) the first region bulks extending from the respective first region surfaces toward the second microporous surface, the first region bulks comprising a first set of pores having outer rims, prepared by removing introduced dissolvable nanoparticles, the first set of pores having a first controlled pore size of about 310 nm, and a second set of pores connecting the outer rims of the first set of pores, the second set of pores having a second controlled pore size of about 93 nm, and a first polymer matrix supporting the first set of pores; (b) the second region bulks extending from the respective second region surfaces toward the second microporous surface, the second region bulks comprising a third set of pores having outer rims, prepared by removing introduced dissolvable nanoparticles, the third set of pores having a third controlled pore size of about 570 nm, and a fourth set of pores connecting the outer rims of the third set of pores, the fourth set of pores having a fourth controlled pore size of about 171 nm, and a second polymer matrix supporting the third set of pores, wherein the second region bulks extend from the respective second region surfaces to the second surface, the second surface comprising a patterned surface comprising a plurality of third region surfaces comprising the peaks and a plurality of fourth region surfaces comprising the valleys.

A first casting solution comprising a polymer stock solution and particle stock solution including nanoparticles having diameters of approximately 570 nm is prepared as described in Example 1.

A second stock solution having nanoparticles having diameters of approximately 310 nm is prepared.

A second casting solution is prepared as follows: A second polymer (resin) stock solution (to be combined with the second particle stock solution) is prepared as follows: In a jacketed kettle kept at 47° C. using a circulating bath, 33% (w/w) PES resin (BASF, Ultrason E 6020 P), 2% PEG-400, 13% (w/w) NMP, and 52% (w/w) DMF are mixed at 800 rpm using an overhead mixer for 4 hr. The solution is placed under vacuum at 200 mbar for 30 minutes to deaerate the solution. The second resin stock solution and the second particle stock solution are combined in a flask and mixed at 30,000 rpm for 2 min with final concentrations of 40% (w/w) particles, 14% PES, 1% PEG-400, 5% NMP, and 40% DMF, followed by deaeration at 200 mbar for 30 min.

Using a casting bar with no gap, the first casting solution is cast on a PEG-400 coated preconditioned polypropylene support. Immediately after casting the first solution, the second casting solution is cast on the first solution, using a casting bar gapped at 5 mil, and placed in an oven at 50° C. for 30 min.

The membrane is soaked in 1 mol/L HCl for 1 hr., followed by soaking in 2 mol/L KOH for 5 hr. Subsequently, the membrane is washed with DI water at 25° C. for 2 hr. and dried at 50° C. for 30 min.

The first surface of the membrane has an Ra of at least about 1 micrometer.

FIG. 4 is a diagrammatic view of the membrane, showing the porous bulk, wherein the membrane has a peak (top of zone 1) and a valley (top of zone 2). FIG. 6 is an SEM showing an enlarged partial cross-sectional view of the membrane showing a first region bulk comprising a first controlled pore size of about 570 nm and a second region bulk comprising a third controlled pore size of about 310 nm.

Example 3

This example demonstrates the preparation of a membrane according to an embodiment of the invention, the membrane comprising a single integral layer having (i) a first microporous surface; (ii) a second microporous surface; wherein the first microporous surface comprises a patterned surface comprising a plurality of peaks and valleys, the patterned surface comprising a plurality of first region surfaces comprising the peaks and a plurality of second region surfaces comprising the valleys; and, (iii) a porous bulk between the first microporous surface and the second microporous surface, the porous bulk comprising a plurality of first region bulks and a plurality of second region bulks; (a) the first region bulks extending from the respective first region surfaces toward the second microporous surface, the first region bulks comprising a first set of pores having outer rims, prepared by removing introduced dissolvable nanoparticles, the first set of pores having a first controlled pore size of about 570 nm, and a second set of pores connecting the outer rims of the first set of pores, the second set of pores having a second controlled pore size of about 171 nm, and a first polymer matrix supporting the first set of pores; (b) the second region bulks extending from the respective second region surfaces toward the second microporous surface, the second region bulks comprising a third set of pores having outer rims, prepared by removing introduced dissolvable nanoparticles, the third set of pores having a third controlled pore size of about 570 nm, and a fourth set of pores connecting the outer rims of the third set of pores, the fourth set of pores having a fourth controlled pore size of about 171 nm, and a second polymer matrix supporting the third set of pores, the second surface comprising a patterned surface comprising a plurality of third region surfaces comprising the peaks and a plurality of fourth region surfaces comprising the valleys.

A stock solution having nanoparticles having diameters of approximately 570 nm is prepared.

A polymer (resin) stock solution (to be combined with the particle stock solution) is prepared as follows: In a jacketed kettle kept at 38° C. using a circulating bath, 33% (w/w) PVDF resin (Solvay), and 67% DMAC are mixed at 800 rpm using an overhead mixer for 4 hr. The solution is placed under vacuum at 200 mbar for 30 minutes to deaerate the solution.

A casting solution is prepared as follows: The resin stock solution and the particle stock solution are combined in a flask and mixed at 30,000 rpm for 2 min with final concentrations of 35% (w/w) particles, 14% PVDF, 27% DMAC, and 24% DMF, followed by deaeration at 200 mbar for 30 min.

Using a casting bar gapped to 5 mil, the casting solution is cast on an uncoated polypropylene substrate and placed in an oven for 30 min. at 50° C., then immersed in DI water at 80° C. for 1 hr. The membrane is soaked in 1 mol/L HCl for 1 hr., followed by soaking in 2 mol/L KOH for 5 hr. Subsequently, the membrane is washed with DI water at 25° C. for 2 hr. and dried at 50° C. for 30 min.

The first surface of the membrane has an Ra of at least about 1 micrometer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A microporous membrane comprising a single integral layer having
   (i) a first microporous surface;
   (ii) a second microporous surface;
      wherein at least the first microporous surface comprises a patterned surface comprising a plurality of peaks and valleys, the peaks each having an elevated rounded top or an elevated level plateau-like top; the patterned surface comprising a plurality of first region surfaces comprising the peaks and a plurality of second region surfaces comprising the valleys;
   and,
   (iii) a porous bulk between the first microporous surface and the second microporous surface, the porous bulk comprising a plurality of first region bulks and a plurality of second region bulks;
      (a) the first region bulks extending from the respective first region surfaces toward the second microporous surface, the first region bulks comprising a first set of pores having outer rims, prepared by removing introduced dissolvable silica nanoparticles, the first set of pores having a first controlled pore size, and a second set of pores connecting the outer rims of the first set of pores, the second set of pores having a second controlled pore size, and a first polymer matrix supporting the first set of pores, wherein the first controlled pore size is greater than the second controlled pore size;
      (b) the second region bulks extending from the respective second region surfaces toward the second microporous surface, the second region bulks comprising a third set of pores having outer rims, prepared by removing introduced dissolvable silica nanoparticles, the third set of pores having a third controlled pore size, and a fourth set of pores connecting the outer rims of the third set of pores, the fourth set of pores having a fourth controlled pore size, and a second polymer matrix supporting the third set of pores, wherein the third controlled pore size is greater than the fourth controlled pore size; wherein the first controlled pore size is at least about 10% less than the third controlled pore size, or the first controlled pore size is at least about 10% greater than the third controlled pore size.

2. The membrane of claim 1, wherein the first region bulks extend from the respective first region surfaces to the second surface, and the second region bulks extend from the respective second region surfaces to the second surface.

3. The membrane of claim 1, wherein the second region bulks extend from the respective second region surfaces to the second surface.

4. The membrane of claim 1, wherein the second surface comprises a second patterned surface comprising a plurality of peaks and valleys, the peaks each having an elevated rounded top or an elevated level plateau-like top; the second patterned surface comprising a plurality of third region surfaces comprising the peaks and a plurality of fourth region surfaces comprising the valleys.

5. The membrane of claim 1, wherein the first microporous surface has an Ra of at least about 1 micrometers.

6. A method of filtering a fluid, the method comprising passing the fluid through the membrane of claim 1.

7. A method of making the microporous membrane of claim 1, the method comprising:
- (a) casting a first dissolvable silica nanoparticle-containing polymer solution onto a patterned substrate having a pattern providing a template of peaks and valleys;
- ($a^1$) casting a second dissolvable silica nanoparticle-containing polymer solution onto the cast solution of (a), wherein the second dissolvable silica nanoparticles have a particle size that is at least about 10% less than or 10% greater than the particle size of the first dissolvable silica nanoparticles;
- (b) carrying out phase inversion and obtaining a membrane comprising at least one patterned microporous surface comprising a pattern of peaks and valleys, the peaks each having an elevated rounded top or an elevated level plateau-like top;
- (c) dissolving the nanoparticles and obtaining a nanoparticle-depleted membrane; and,
- (d) washing the nanoparticle-depleted membrane.

8. The membrane of claim 2, wherein the first microporous surface has an Ra of at least about 1 micrometers.

9. The membrane of claim 3, wherein the first microporous surface has an Ra of at least about 1 micrometers.

10. The membrane of claim 4, wherein the first microporous surface has an Ra of at least about 1 micrometers.

* * * * *